(12) United States Patent
Weinstock et al.

(10) Patent No.: US 8,332,523 B2
(45) Date of Patent: Dec. 11, 2012

(54) ARCHITECTURE TO ENABLE KEYBOARD, VIDEO AND MOUSE (KVM) ACCESS TO A TARGET FROM A REMOTE CLIENT

(75) Inventors: Neil Weinstock, Morristown, NJ (US); Siva Somasundaram, Dayton, NJ (US); Ronald Wahl, Chemnitz (DE)

(73) Assignee: Raritan Americas, Inc., Somerset, NJ (US)

( * ) Notice: Subject to any disclaimer, the term of this patent is extended or adjusted under 35 U.S.C. 154(b) by 565 days.

(21) Appl. No.: 11/341,117

(22) Filed: Jan. 27, 2006

(65) Prior Publication Data

US 2007/0115992 A1 May 24, 2007

(51) Int. Cl.
*H04L 12/56* (2006.01)
(52) U.S. Cl. ......... 709/229; 370/392; 370/401; 709/227
(58) Field of Classification Search .................. 710/4, 5, 710/28, 29, 73, 72, 65, 316; 345/1.1, 1.2, 345/2.1, 2.3; 709/206, 223, 225, 227, 208, 709/245, 229, 219, 203; 370/252, 352, 389, 370/396, 466, 392, 401; 348/705, E05.057
See application file for complete search history.

(56) References Cited

U.S. PATENT DOCUMENTS

| | | | |
|---|---|---|---|
| 5,721,842 A | 2/1998 | Beasley | |
| 5,732,212 A | 3/1998 | Perholtz | |
| 5,884,096 A | 3/1999 | Beasley | |
| 5,937,176 A | 8/1999 | Beasley | |
| 5,978,376 A * | 11/1999 | Godse et al. ................... | 370/396 |
| 6,112,264 A | 8/2000 | Beasley | |
| 6,345,323 B1 | 2/2002 | Beasley | |
| 6,557,170 B1 | 4/2003 | Wilder | |
| 6,560,227 B1 * | 5/2003 | Bartoldus et al. ............. | 370/390 |
| 6,601,101 B1 * | 7/2003 | Lee et al. ....................... | 709/227 |
| 6,671,756 B1 | 12/2003 | Thomas | |
| 6,681,250 B1 * | 1/2004 | Thomas et al. ............... | 709/226 |
| 6,725,264 B1 * | 4/2004 | Christy ......................... | 709/225 |
| 6,771,213 B2 | 8/2004 | Durst | |
| 6,915,362 B2 * | 7/2005 | Ramsey et al. ................. | 710/62 |
| 6,917,626 B1 * | 7/2005 | Duvvury ....................... | 370/466 |
| 7,113,978 B2 * | 9/2006 | Beasley et al. ................ | 709/208 |
| 7,133,393 B2 | 11/2006 | Ala-Luukko | |
| 7,167,923 B2 * | 1/2007 | Lo ................................. | 709/245 |
| 7,231,660 B1 * | 6/2007 | Daude et al. ...................... | 726/4 |

(Continued)

FOREIGN PATENT DOCUMENTS

WO 0205085 1/2002

(Continued)

OTHER PUBLICATIONS

Bergen Il et al. Building an MPI Cluster, Crossroads, The ACM Student Magazine, vol. 8, Issue 5, Aug. 2002.*

(Continued)

*Primary Examiner* — Wing Chan
*Assistant Examiner* — Kostas Katsikis

(57) ABSTRACT

A keyboard, video and mouse over an Internet Protocol (IP) switch in which the master and target interfaces share the same IP address and access to the target interfaces from the client is via a Transmission Control Protocol/IP network. The master is able to determine into which switch port the target interface is connected by reading media access control address tables of a switch chipset. Such provides immediate association for a target interface, i.e., the Ethernet port number.

13 Claims, 9 Drawing Sheets

U.S. PATENT DOCUMENTS

| | | | |
|---|---|---|---|
| 7,441,063 B2 * | 10/2008 | Tseng et al. | 710/305 |
| 7,519,749 B1 | 4/2009 | Sivertsen | |
| 7,554,959 B1 * | 6/2009 | Dowling | 370/338 |
| 7,613,854 B2 | 11/2009 | Chen | |
| 7,818,480 B2 | 10/2010 | Hoerl | |
| 2002/0087753 A1 | 7/2002 | Beasley et al. | |
| 2002/0097220 A1 * | 7/2002 | Ferguson et al. | 345/156 |
| 2002/0188730 A1 * | 12/2002 | Tang et al. | 709/227 |
| 2002/0188753 A1 * | 12/2002 | Tang et al. | 709/237 |
| 2003/0088655 A1 | 5/2003 | Leigh et al. | |
| 2003/0131127 A1 | 7/2003 | King et al. | |
| 2003/0135654 A1 | 7/2003 | Chang | |
| 2003/0210700 A1 * | 11/2003 | Chen | 370/401 |
| 2004/0024851 A1 * | 2/2004 | Naidoo et al. | 709/219 |
| 2004/0064559 A1 * | 4/2004 | Kupst et al. | 709/226 |
| 2005/0033815 A1 | 2/2005 | Nagao | |
| 2005/0044184 A1 * | 2/2005 | Thomas et al. | 709/219 |
| 2005/0044186 A1 | 2/2005 | Petrisor | |
| 2005/0066000 A1 | 3/2005 | Liaw | |
| 2005/0125519 A1 * | 6/2005 | Yang et al. | 709/223 |
| 2005/0149738 A1 | 7/2005 | Targosky | |
| 2005/0207366 A1 * | 9/2005 | Chen | 370/313 |
| 2005/0235079 A1 * | 10/2005 | Chen | 710/73 |
| 2005/0273312 A1 | 12/2005 | Sandulescu | |
| 2005/0289403 A1 * | 12/2005 | Rothman et al. | 714/56 |
| 2006/0002371 A1 * | 1/2006 | Chen | 370/352 |
| 2006/0031488 A1 * | 2/2006 | Swales | 709/224 |
| 2006/0104289 A1 | 5/2006 | Lee | |
| 2006/0123182 A1 | 6/2006 | Sandulescu | |
| 2007/0002761 A1 * | 1/2007 | Diamant et al. | 370/252 |
| 2007/0165622 A1 * | 7/2007 | O'Rourke et al. | 370/389 |
| 2011/0066773 A1 | 3/2011 | Sivertsen | |

FOREIGN PATENT DOCUMENTS

| | | |
|---|---|---|
| WO | WO 0205085 A2 * | 1/2002 |
| WO | WO 2007138068 A1 * | 12/2007 |

OTHER PUBLICATIONS

Bellavista et al. How to Support Internet-based Distribution of Video on Demand to Portable Devices, Proceedings of the Seventh International Symposium on Computers and Communications (ISCCC'02) IEEE Xplore 2002.*

Finlayson et al., Network Working Group, Request for Comments: 903, A Reverse Address Resolution Protocol, Computer Science Department, Stanford University, Jun. 1984.*

The Written Opinion by the International Searching Authority, issued on Oct. 19, 2007, in the PCT application No. PCT/US07/01498.

International Search Report and Written Opinion by the International Searching Authority, issued on Aug. 14, 2006, in the PCT application No. PCT/US06/12281.

File History of Reissue U.S. Patent No. 5,732,212, Apr. 11, 2002. Part 1.

File History of Reissue U.S. Patent No. 5,732,212, Apr. 11, 2002. Part 2.

File History of U.S. Appl. No. 10/032,325, Jun. 14, 2004.

Findings and Conclusions, Apex v. Raritan, Civil Action No. 01-CV-0035, Feb. 25, 2002.

Investor's Business Daily, Box Keeps Monitors, Mice to a Minimum, Sep. 8, 1997.

Joseph C. McAlexander Deposition Transcript, Case No.: 01-CV-4435, Apr. 27, 2005.

KVM Switch History, Aug. 2, 2002, 2 pages.

KVM Switches Roundup, Windows NT Magazine, Jul. 1997.

Lan Times, The beauty of Apex is a two-sided story, Nov. 20, 1995.

Lightwave Communications, Inc., Product Brochure, APX 304594-304605, Jun. 1, 1998.

Lu, E&J Int. 4-Port KVM Switch, Jul. 4, 2001.

Marksman Transcript, Avocent v. Raritan, Civil Action No. 4435, Feb. 3, 2005.

Marksman Transcript, Avocent v. Raritan, Civil Action No. 4435, Feb. 4, 2005.

Memorandum and Order on Marksman issues, Case No. 01-CV-4435, (Mar. 11, 2005).

Network Computing, Product Brochure, May 15, 1995, 5 pages.

Network Technologies Inc., Product Brochure, 1998, 2 pages.

Network World, advisement, Jul. 6, 1992.

Ocean Isle, Reachout Product Brochure, RCI 172996-173006, Jun. 1994.

PC World, New Products, May 1995, 2 pages.

PolyCon GmbH Data System Inc., product catalogs, APX 024328-042697, prior to Spring, 1995.

Press Release, Maintain Error-Free Central Control of 128 PCs from One Set of Keyboard, Mouse, and Monitor, Feb. 4, 1999, 1 page.

Protest Under 37 CFR 1.291 Filed in U.S. Appl. No. 08/969,723, Feb. 13, 1999.

Raritan, CompuSwitch, Mar. 16, 1998, 1 page.

Raritan, Dominion KSX, Jul. 19, 2003, RCI 139356-139371.

Raritan, Dominion KX and Dominion KSX, 2004, 181193-181211.

Raritan, MasterConsole MXU2, Jul. 31, 2001.

Raritan, MasterConsole II, User's Manual, 2000.

Raritan, Paragon UMT2161, RCI 147483-147505, Jul. 5, 2002.

Raritan, Paragon User's Guide, Jun. 15, 2000.

Raritan, Paragon II User Manual, 2004.

Raritan, Products Brochure, 2004-2005, p. 185899-185912.

Raritan, Product Introduction, Oct. 23, 2000.

Rebuttal Expert Report of Joseph C. McAlexander Regarding Validity and Infringement of U.S. Patent Nos. 5,884,096, 5,937,176 and 6,112,264, Apr. 11, 2005.

Rextron, Product Brochure, Aug. 1, 2002, 5 pages.

Rose Electronics, "Master Switch Installation and Operation Manual," 1991.

Rose Electronics, UltraView Installation and Operation Manual, 1991-1997.

Rose Electronics, Ultra View, Aug. 1, 2002, RCI 173332-173336.

Startech Computer Products Ltd., Product Press Release, APX 304618-304619, Feb. 1998.

Supplemental Expert Report of Bruce McNair Regarding United States Patent Nos. 5,884,096 & 6,112,264 and 5,937,176, Apr. 17, 2005.

Supplemental Expert Report of Joseph C. McAlexander Regarding Infringement of U.S. Patent Nos. 5,884,096, 5,937,176 and 6,112,264, Mar. 22, 2005.

Supplemental Expert Report of Michael H. Davis, Apr. 18, 2005.

SwitchCom, ProServer, Aug. 1, 2002, 2 pages.

Tikkler, Belkin OmniView SE 4-Port KVM Switch, Nov. 8, 2000.

Tony Dekerf and Gary D. Davis, "A Close Look At Modern Keyboard, Video & Mouse Switches," 1995.

Trial Transcript, Apex v. Raritan, Southern District of New York, Case No. 01-CV-4435, vol. 1, Jan. 2002.

Trial Transcript, Apex v. Raritan, Southern District of New York, Case No. 01-CV-4435, vol. 2, Jan. 2002.

Trial Transcript, Apex v. Raritan, Southern District of New York, Case No. 01-CV-4435, vol. 3, Jan. 2002.

Trial Transcript, Apex v. Raritan, Southern District of New York, Case No. 01-CV-4435, vol. 4, Jan. 2002.

Trial Transcript, Apex v. Raritan, Southern District of New York, Case No. 01-CV-4435, vol. 5, Jan. 2002.

Trial Transcript, Apex v. Raritan, Southern District of New York, Case No. 01-CV-4435, vol. 6, Jan. 2002.

Trial Transcript, Apex v. Raritan, Southern District of New York, Case No. 01-CV-4435, vol. 7, Jan. 2002.

Tron International, Inc., KVM Products Catalogs, 1997.

Tron International, Inc., Products Catalogs, 1996.

Tron International, Inc., Product Brochure, 1997, 4 pages.

Unisys, PW2 Advantage Series Rackmount Server, 1995.

Yee Liaw Deposition Transcript, Case No. 01-CV-4435, Mar. 3, 2005.

Yee-Shung Liaw Deposition Transcript, Case No. 01-CV-4435, Dec. 6, 2001.

The list of docket reports in the litigation: Avocent Redmond Corp. v. Raritan Computer, Inc., Civil Action No. 1:01-CV-04435(PKC), United States District Court for the Southern District of New York.

Adder, Products Brochure, APX 304572-304579, Apr. 1, 1998, 8 pages.

AdderViewOSD, Products Brochure, RCI 173246-173279, Aug. 1, 2002.

Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex, OutLook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621.
Apex et al, Products Brochure, APX 316848-316909.
Apex et al, Products Brochure, APX 316910-316969.
Apex's Sales Brochure, Sep. 1, 1998, 1 page.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.
Cybex, Director Installer/User Guide, Nov. 1996.
Cybex, 4 x P & 1 x P KVM SWITCHES Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-Cv-4435, Dec. 15, 2004.
Declaration of Sharad Malik, Ph. D., Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer, Inc.'s Response to Plaintiffs Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiffs First Set of Interrogatories (Nos. 9-12), Aug. 31, 2001.
Defendant Raritan Computer, Inc.'s Supplemental Response to Plaintiffs Second Set of Interrogatories (Nos. 9-12), Dec. 12, 2001.
DEI, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
The extended European Search Report, mailed on Apr. 17, 2012, in the related European Patent Application No. 06749148.0.
Office Actions, mailed on Jul. 16, 2009, Mar. 25, 2010, Dec. 29, 2010, Aug. 9, 2011, Nov. 25, 2011 and Jun. 8, 2012, in the related U.S. Appl. No. 11/100,346.
Belkin Corporation, "2-Port Kvm Switch with Built-In Cabling" User Manual, F1DK102P, published in 2003, total pages: 21.
Defendant Raritan Computer Inc.'s Response to Plaintiffs First Set of Post Remand Interrogatory Requirements to Raritan (No. 1R-16R). (Dec. 16, 2004).

* cited by examiner

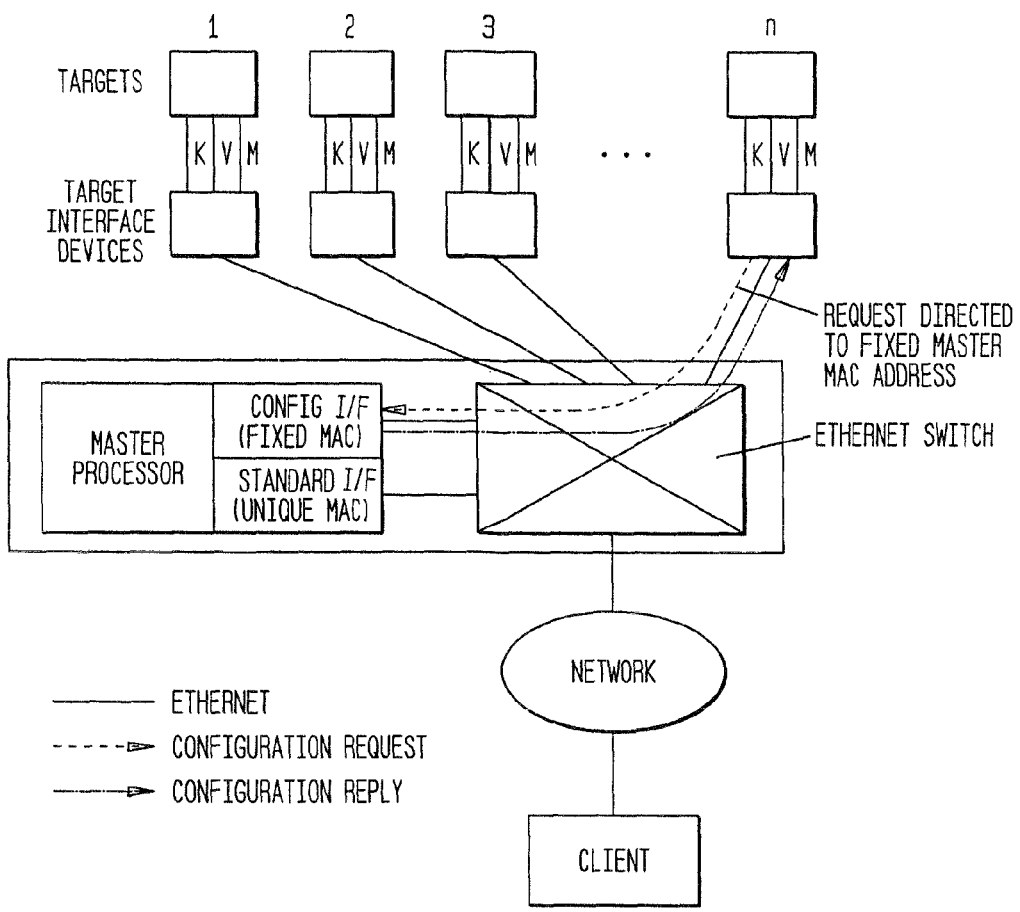

ARCHITECTURE TO ENABLE KEYBOARD, VIDEO AND MOUSE (KVM) ACCESS TO A TARGET FROM A REMOTE CLIENT

CROSS-REFERENCE TO RELATED PATENT APPLICATIONS

Ser. No. 11/100,346 filed Apr. 6, 2005 entitled "SCALABLE, MULTI-CHANNEL REMOTE DEVICE MANAGEMENT SYSTEM".

BACKGROUND OF THE INVENTION

1. Field of the Invention

The present invention relates to a keyboard, video and mouse (KVM) access over an Internet Protocol (IP) switch to a target, e.g., a server, from a remote client (a user with a desktop PC or laptop or the like) connected via a Transmission Control Protocol/Internet Protocol (TCP/IP) network.

2. Description of Related Art

Conventionally, KVM-IP devices enable access over an IP switch for a remote client by doing the following:

1) Transport video: the KVM-IP device connects to the target's video output and digitizes it for transport over the digital TCP/IP network to the client. To minimize the amount of network traffic load, the video is usually compressed using any of a variety of methods.

2) Transport keyboard and mouse: the KVM-IP device also connects to the keyboard and mouse interfaces on the target (typically either PS2 or universal serial bus USB), and relays keystrokes and mouse movements from the client to the target.

3) Status: generally, the KVM-IP device monitors status of the target and conveys it to the client.

The hardware to implement the video transport (generically referred to as an analog/digital (A/D) channel) is expensive, which is why there are conventional KVM-IP devices that connect to more targets (N) than they have A/D channels (M) and use an N×M switch to multiplex the targets to the A/D channels. This constrains the system to only accessing M targets at a time, precluding some advanced features that require continuous access to all targets. Such a system is relatively easy to configure, however, because all the networking intelligence is centralized into a single box, as exemplified by the KX216 product of Raritan Computer (illustrated schematically in FIG. 1).

An alternate approach, illustrated in FIG. 2, is to use a KVM-IP device that provides a dedicated connection to a single target (e.g., a desktop computer or server) and optionally employ a KVM gateway/aggregation device such as the Command Center Secure Gateway provided by Raritan Computer. By using one KVM-IP device for each target, all targets may be monitored simultaneously, enabling advanced features. However, this type of deployment can be cumbersome, because a large number of independent TCP/IP devices must be administered. Some standard techniques can ease the burden (dynamic host configuration protocol (DHCP), centralized management systems such as CC Secure Gateway), but two problems remain:

1) Each KVM-IP device must at some point be manually identified and associated with its connected target.

2) Each KVM-IP device must consume an IP address on the network.

It would be preferable to maintain the performance and feature advantages of the latter solution while eliminating its disadvantages.

The KIMBLE system is a project done by Raritan Peppercon that takes a cluster of eight 1×1 KVM-IP devices, and enables them to share a single IP address and behave as a single 8×8 device. Configuring the KIMBLE system requires a cluster configuration tool, which is used to assign nodes to clusters, and distribute information about a cluster to each of its members. In other words, clusters do not self-configure.

The KIMBLE system cluster selects a master processor ("master"), which then becomes the cluster's portal to the outside world. The initial connection from the client is made to the master. This connection is used for authentication and authorization, and to retrieve information about the cluster. To create a KVM connection to a particular target, the client initiates a TCP connection to the master, using a special TCP port number assigned to that target.

The master routes the packets on this connection very simply, by inspecting the incoming port number and, via a table lookup, inserting the MAC address of the desired element. For the most part, the client is unaware that it is being served by a cluster rather than a single device, but this scheme does require that the cluster may be accessed on a number of different TCP ports.

Because all elements within the cluster share the same IP address, "normal" IP communication within the cluster is not possible. Instead, an intra-cluster communication is employed. That is, the KIMBLE system starts by assigning a special, private IP address (127.1.0.x) to each element in the cluster. These addresses have significance only within the cluster. Such addresses are not allowed on the wire. Each element knows the private IP address and MAC address of each other element in the cluster, and creates static address resolution protocol (ARP) table entries for each. This is necessary because it's not allowed to ARP these addresses on the wire. The responsibility thus falls on the cluster configuration tool to distribute this information to all the cluster elements at configuration time.

When sending to a destination element within the cluster, a source element internally sets its destination IP address to the destination's private address (say, 127.1.0.5). Before appearing on the wire, the Network Address Translation (NAT) function swaps the cluster IP address in for the destination IP address (by this time, the destination MAC address has already been correctly set in the packet). The packet is then sent on the wire to the destination, routed through the intervening Ethernet switching network via the MAC address.

The destination element, upon receiving the packet, looks at the source IP address. If it is equal to the cluster IP address, it substitutes the source's private IP address in for the source IP address of the packet. The packet is then passed to the TCP/IP stacks for normal processing.

In this way, the cluster elements communicate via their private IP addresses, while only the cluster IP address appears on the wire.

FIG. 6 shows the KIMBLE intra-cluster communication, although the representation is not literally accurate as to how the TCP/IP stacks work. It does illustrate adequately how the various translations take place along the path from point A to point B.

It would be desirable to provide high performance and a high level of features to a KVM-IP product, while keeping configuration as simple as "plug and play" so that the architecture, from a configuration standpoint, looks like a simple current-generation KX, but internally hides a full TCP/IP network to accomplish its goals.

SUMMARY OF THE INVENTION

One aspect of the invention resides in an architecture configured to hide its internal configuration of a full TCP/IP network and manage multiple target interface devices (or simply, "target interfaces") without any need for individual configuration of multiple network devices. This is effected by allowing a master to obtain an association between target interfaces and corresponding port numbers of an Ethernet switch to hand off a socket of the TCP/IP network to the associated target interface. In this manner, a majority of the traffic between the target interface and a client bypasses the master and thus is not subject to performance constraints of the master.

BRIEF DESCRIPTION OF THE DRAWINGS

For a better understanding of the present invention, reference is made to the following description and accompanying drawings, while the scope of the invention is set forth in the appended claims:

FIG. 9 is a schematic representation of a fixed master MAC address.

DETAILED DESCRIPTION OF THE INVENTION

Figure 1:
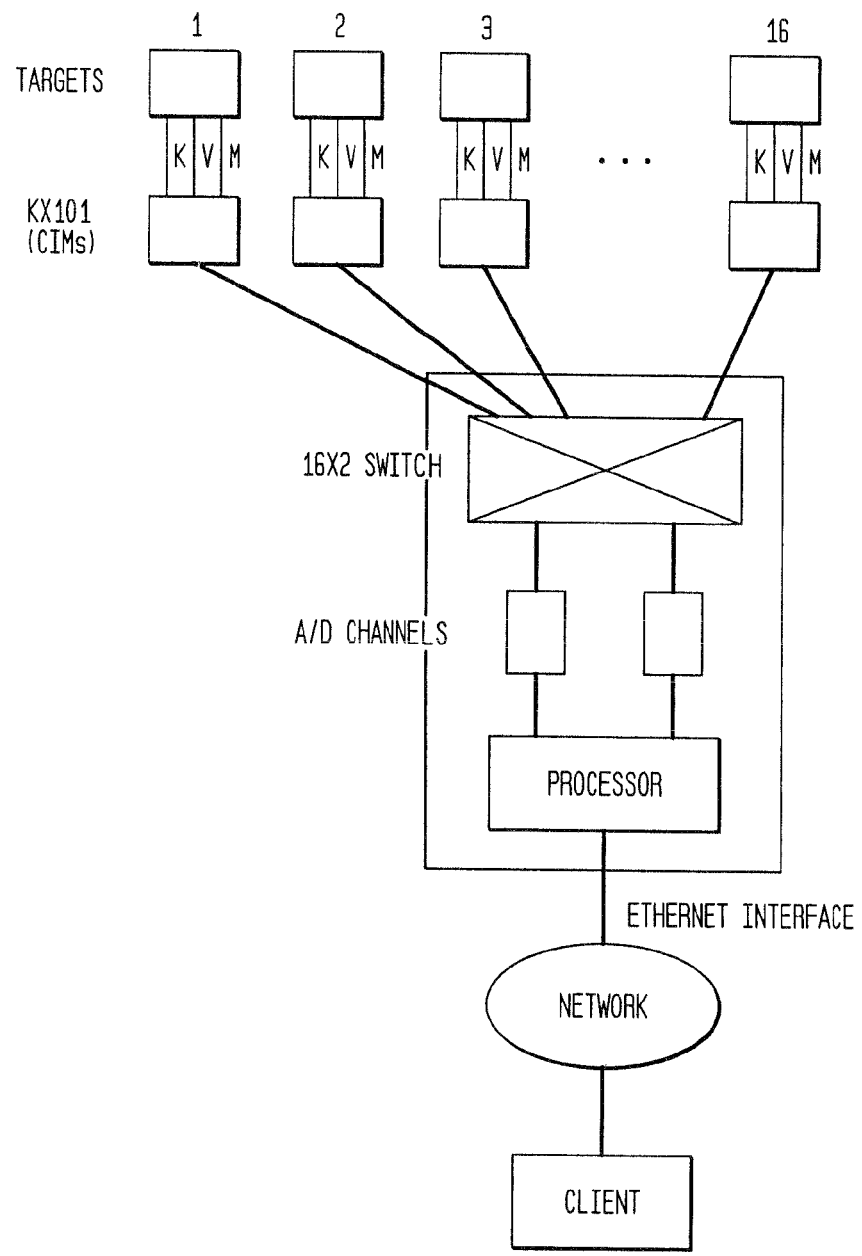
FIG. 1 is a schematic representation of a conventional master and target configuration employing a KX2 device of Raritan Computer.
Figure 2:
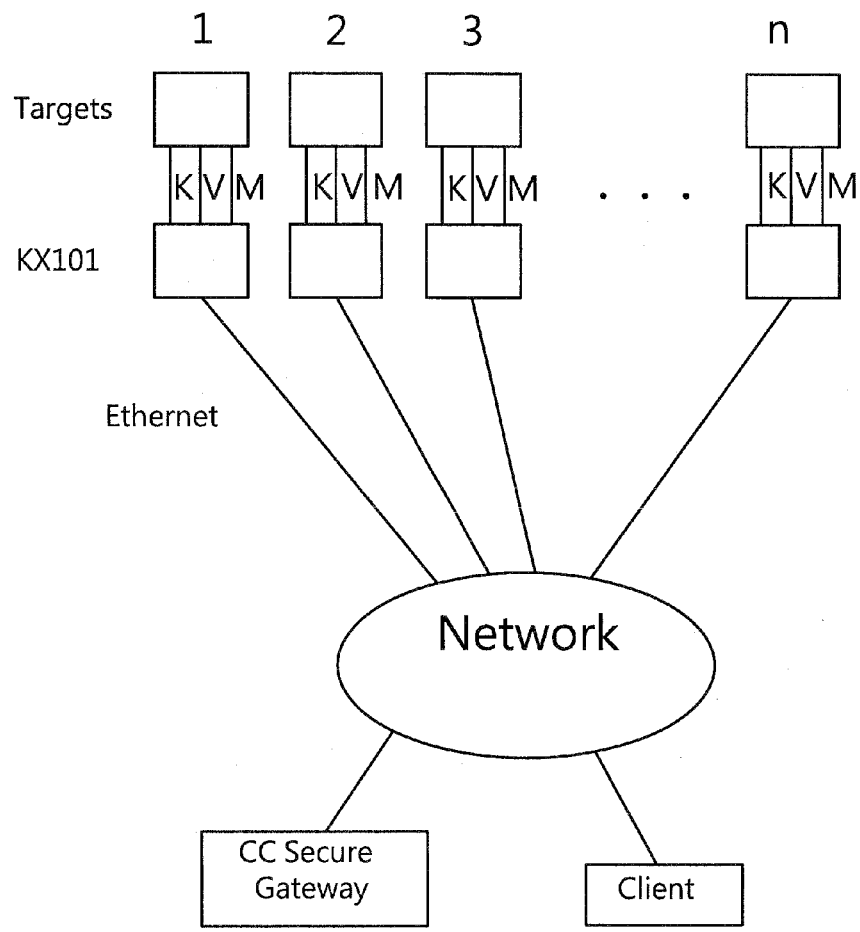
FIG. 2 is a schematic representation of a conventional master and target configuration employing a KVM-IP gateway/aggregation device.
Figure 3:
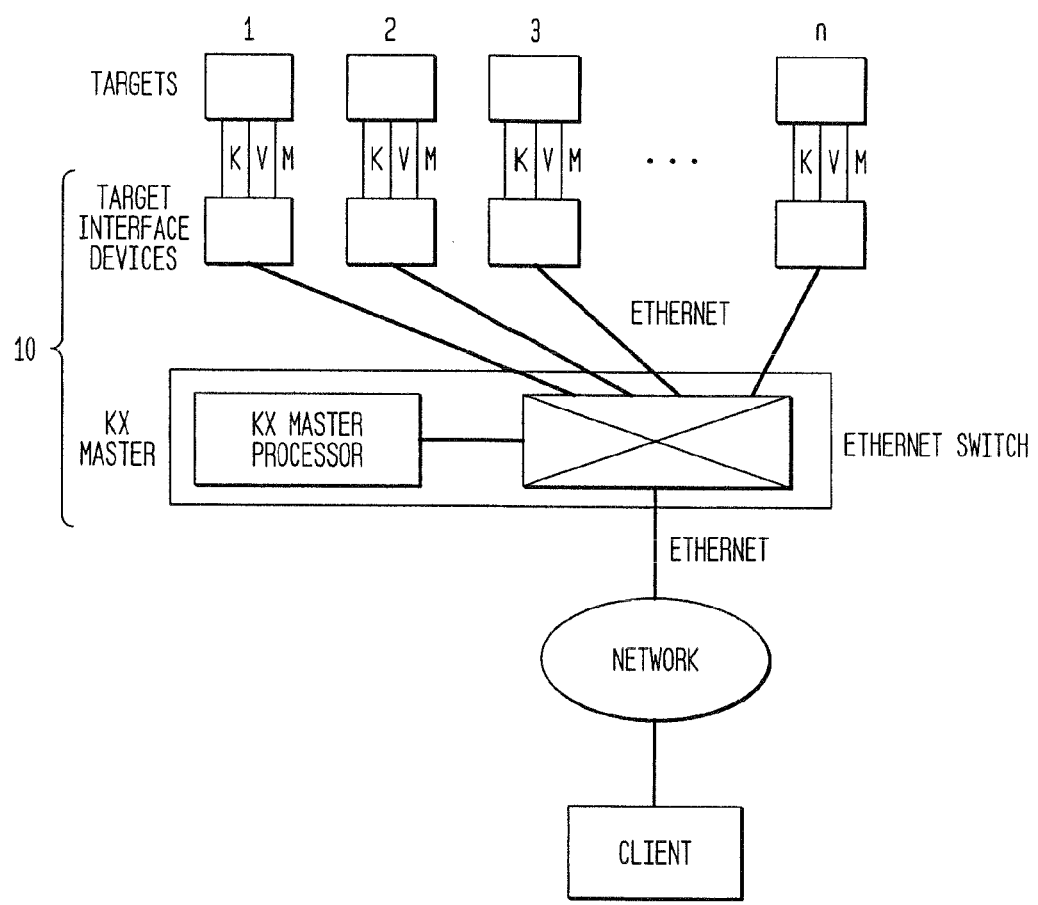
FIG. 3 is a schematic representation of a master and target configuration in accordance with the invention.

The present invention is configured like the solution in FIG. 1, but performs like the solution in FIG. 2. Its basic architecture is shown in FIG. 3.

Each target interface contains a full A/D channel, and a TCP/IP endpoint. These devices connect to a master processor ("master") via standard Ethernet. An Ethernet switch connects the target interfaces, the master, and the external network.

The configuration of the entire system (master+target interfaces) shares a single IP address, which is assigned to the master via standard methods (manual assignment or DHCP). Each target interface, at the time of power-up or initial connection, acquires its configuration from the master.

As part of the configuration process, the master is able to determine into which switch port the target interface is connected, by reading MAC address tables of the switch chipset. This provides an immediate association for a target interface: the Ethernet port number. A target interface that is, for example, connected to port 3, may be initially accessed via an item labeled "port 3" on a list of available targets. Therefore, after plugging the system together, the target interfaces do not need to be physically touched again except as needed for system maintenance.

Figure 4:
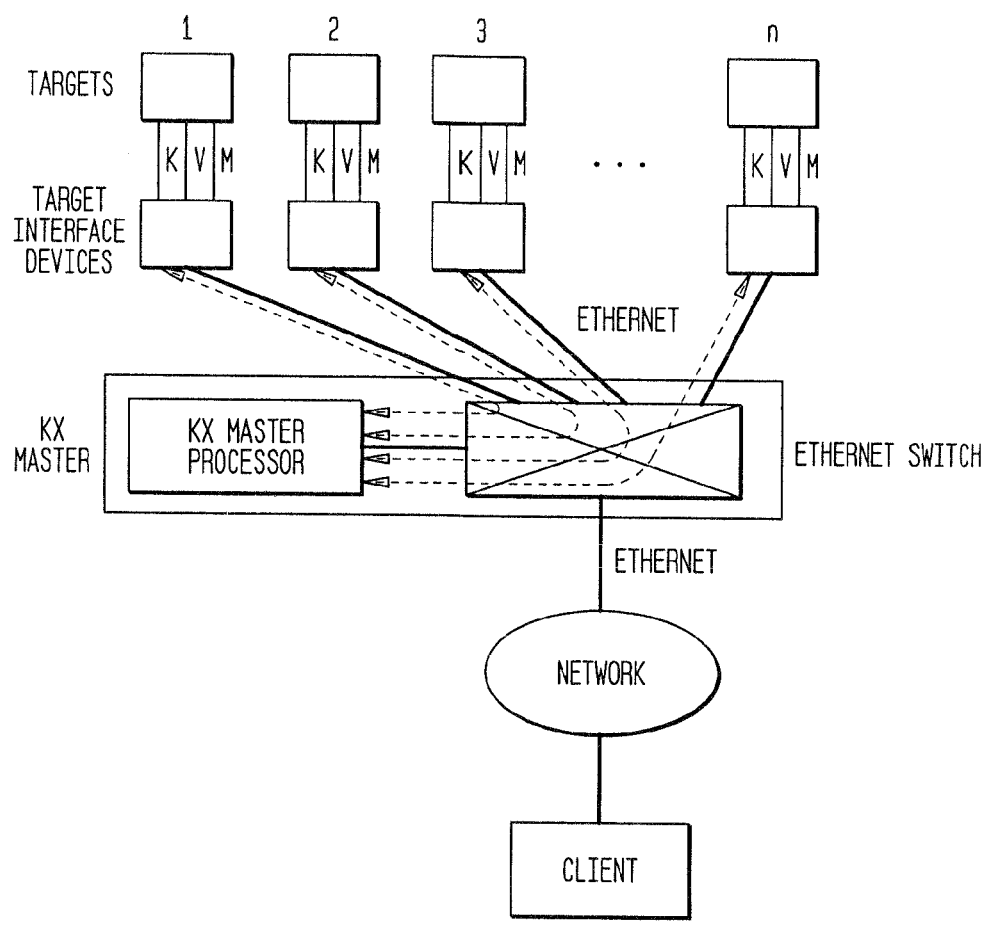
FIG. 4 is a schematic representation of FIG. 3, but further showing how the master has knowledge of the port number and MAC address of each available target (self-configuration) in accordance with the invention.

Following configuration, the master has knowledge of the port number and MAC address of each available target interface. The architecture is illustrated in FIG. 4.

From the standpoint of access by clients (i.e., remote users) on the external network, the architecture 10 of the present invention is a single entity with a single IP address, which is "owned" by the master. To access any one of the connected target interfaces, the client first establishes a connection to the master; this is called the "master connection". Over this master connection, the client is authenticated and authorized, and is then given pertinent information about the architecture 10, including the availability of each connected target interface.

Figure 5:
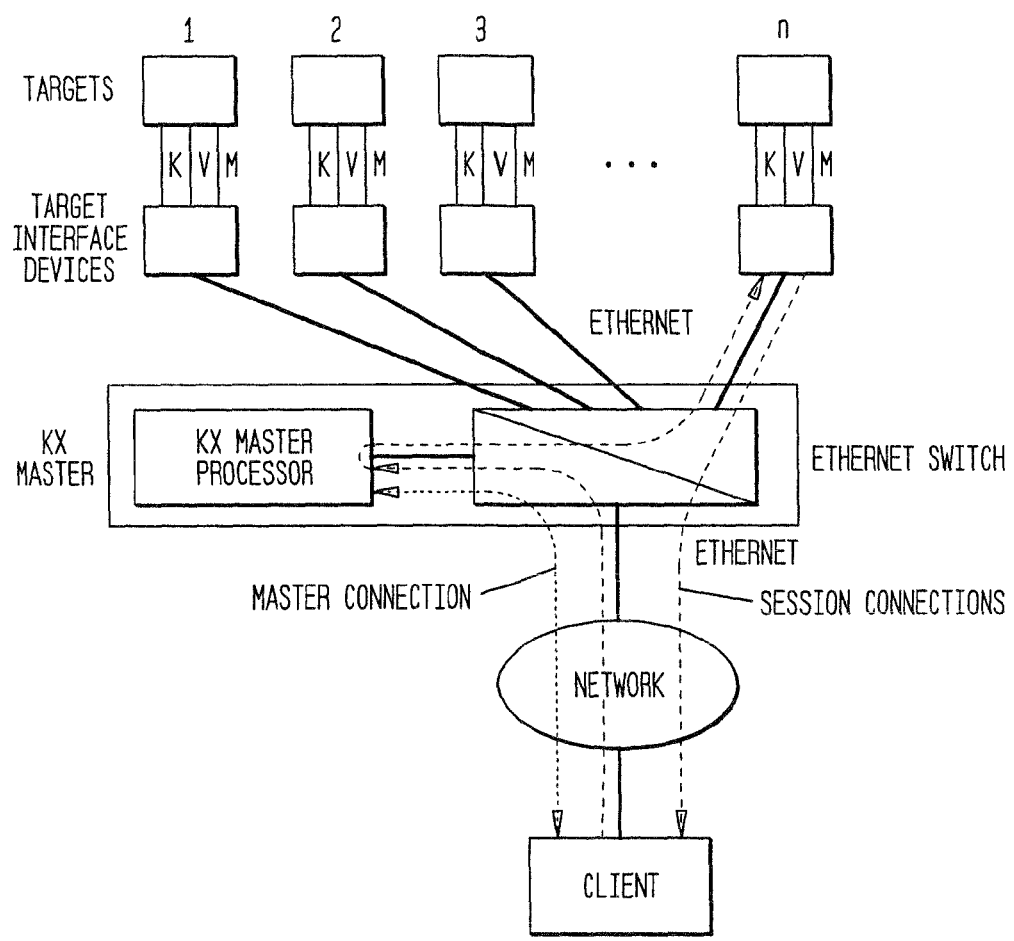
FIG. 5 is a schematic representation of FIG. 3, but further showing a KVM session establishment in accordance with the invention.

Turning to FIG. 5, a connection to a particular target is initiated when the client makes a request over the master connection. The target interfaces are connected to individual ones of the targets and serve the KVM session to the client as required. The master negotiates for a KVM session ID with the selected target interface. The master then provides the client with the session ID; and configures its internal tables to note the association of the session ID with the chosen target interface.

Next, the client establishes a new connection with the master, gives the session ID in the first message. The master (via its tables) determines the target that is associated with that ID, then hands off its TCP/IP socket to the selected target interface. After handing off, the master forwards all future packets on this connection from the client to the target interface, until the connection is closed. The target interface sees the handed off connection as if it had been made directly, and uses the session ID to authorize the connection with the client. From then on, the target interface sends data directly to the client, through the Ethernet switch but not through the master. In this way, the majority of traffic (i.e. the video) from the target interface is not subject to the performance constraints of the master. All packets from the client to the target interface (such as mouse or keyboard inputs) must be routed through the master, but those are much lower in quantity, and therefore do not present a performance problem.

The handoff process described above is based on the TCP handoff technique which is a variant of TCP socket migration. TCP handoff or similar techniques are commonly applied for content-aware switching applications. For the present invention, a routing policy based on client requests is implemented to facilitate KVM session management.

The essence of the handoff process in accordance with the invention is to move a TCP/IP socket from the master to the target interface, so that the target interface functions as if it received the connection directly. The master receives the first packet, and uses its contents to determine to which target interface to route the connection. It then, over a separate connection, transfers the socket state to the target interface, along with the first packet. The target interface then starts the TCP/IP processing on the socket and data, and the application on the target interface has no idea what has happened. The process is similarly transparent to the client; as far as it is concerned it is still talking to the master.

Other approaches can solve such a problem, with different virtues and drawbacks. For example, the master could implement a proxy instead of using handoff. The same basic configuration approach would apply, though: one IP address for the whole system, and the client has no visibility of the separate existence of the target interfaces. With a proxy implementation, all traffic in both directions would need to pass through the master, creating a performance bottleneck that could be solved by increasing the performance of the hardware in the master.

Figure 6:
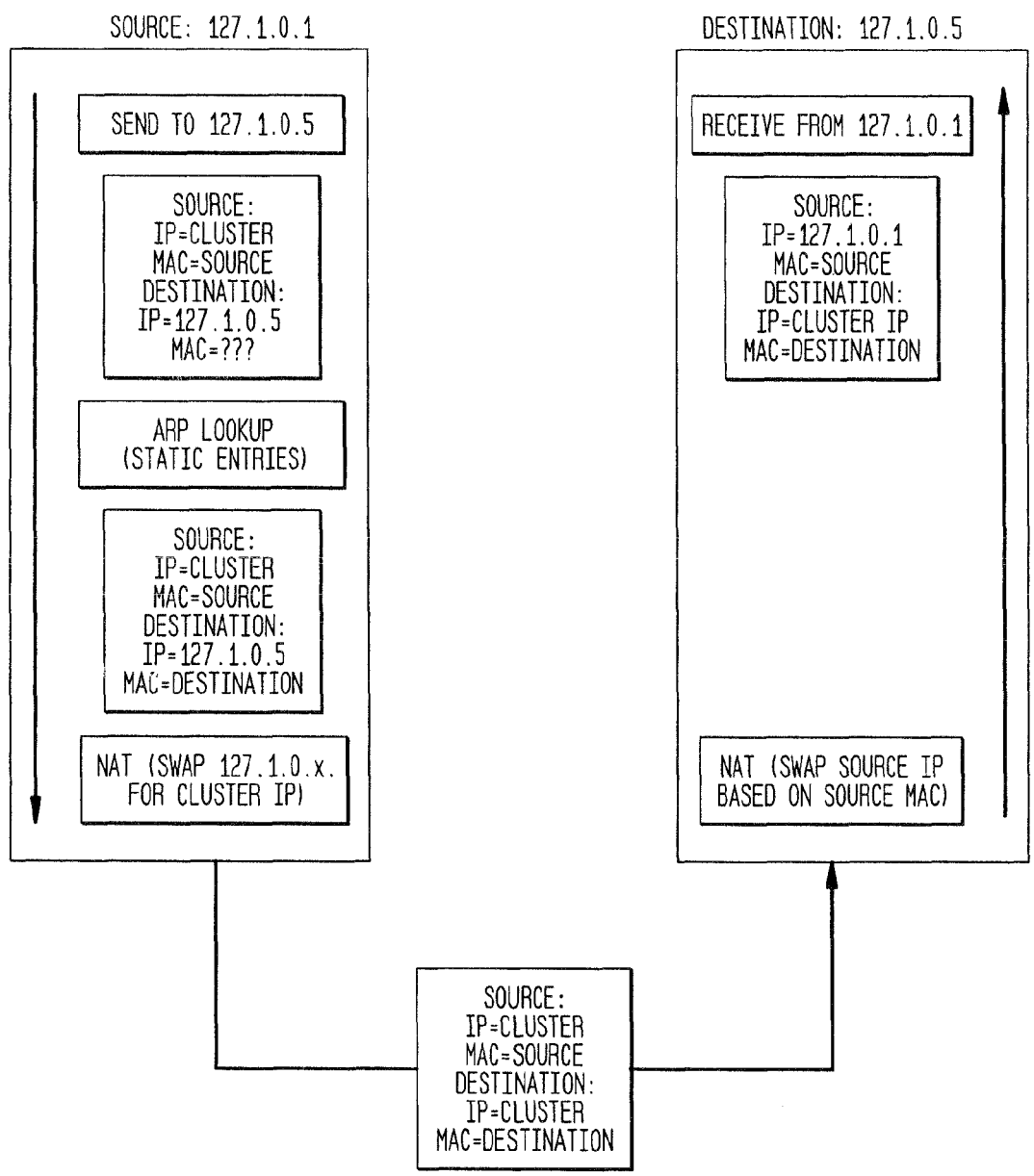
FIG. 6 is a schematic representation of an intra-cluster communication in accordance with the invention.

Turning to FIG. 6, an intra-cluster communication embodiment of the invention is shown in which the same mechanism as the conventional KIMBLE system is adopted for intra-cluster communication purposes. The following explains how the IP addresses are managed inside the cluster for their internal communication.

The master is assigned a fixed private address (127.1.0.254), which may be considered a private IP address that is used for intra communication within the cluster, and each target interface is assigned a number according to its Ethernet switch port number (e.g., port 5 is given 127.1.0.5). In addition to the private IP address, the master is assigned a (public) cluster IP address. Note that many IP addresses may be bound on a single physical interface.

Intra-cluster communication always appears on the wire using the master's cluster IP address in that the Network Address Translation (NAT) functions, which perform the act of changing an address from one to another within a packet, are installed in the master and all target interfaces.

From the outside, a client sends a request to the master's public address. Such is routed to the respective target interface based on the contents of the request.

An external TCP/IP network sees only a single "device" with a single IP address. Despite this, the node of the architecture of the present invention internally works as a network of KVM-IP devices and is therefore able to provide full simultaneous connectivity to all targets, without any serious performance bottleneck in the master.

Figure 7:
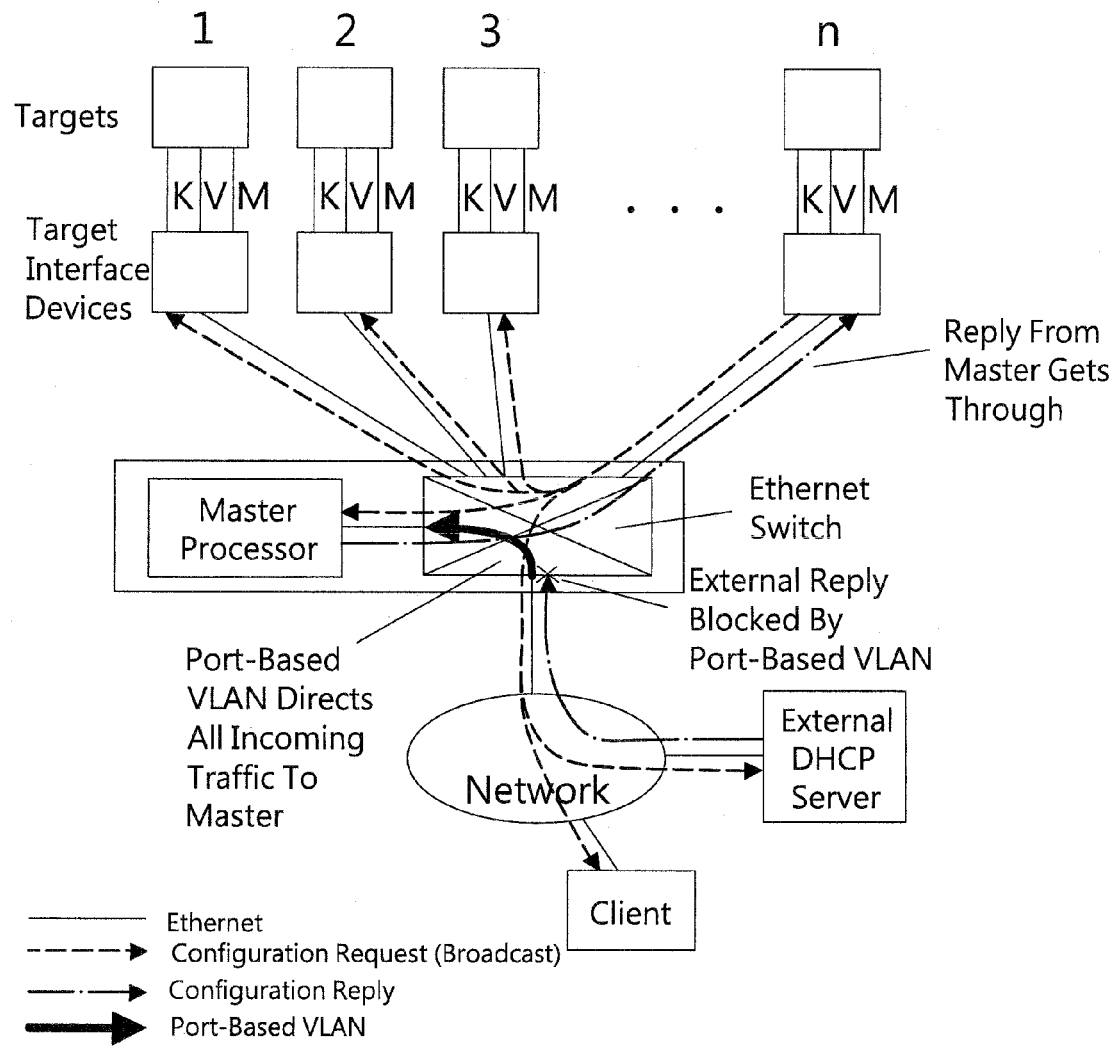
FIG. 7 is a schematic representation of the switch configuration blocking replies from anything other than the master.

Initial contact between the master and the target interfaces is made via one of several possible methods, including:

1) DHCP: As represented in FIG. 7, the target interface broadcasts a DHCP request, which is answered by the master. A port-based VLAN is configured on the Ethernet switch to force all incoming traffic from the network to the Master Processor. Therefore, any attempt by an external agent to directly communicate to a Target Interface will effectively be blocked, including potential responses from other DHCP servers of the network.

Figure 8:
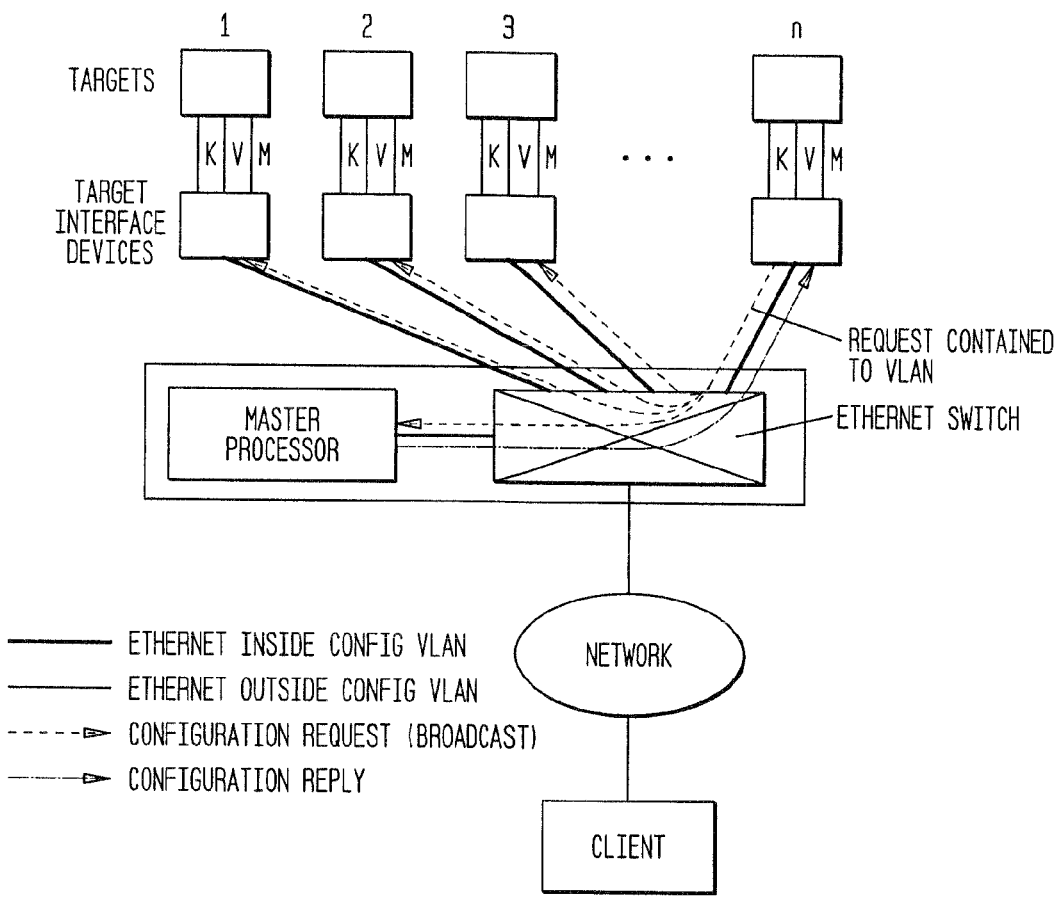
FIG. 8 is a schematic representation of a VLAN configuration to contain a configuration request broadcast.

2) DHCP w/VLAN: A virtual LAN is configured in the master's Ethernet switch, which includes only the master and the target interface switch ports, as represented in FIG. 8. Therefore, only the master will receive the request, and provide the configuration information in response.

3) Fixed master address: It is possible to provide the master processor with a second interface to the Ethernet switch using a fixed, known media access control (MAC) address, as represented in FIG. 9. This address is used only for target interface configuration, and is therefore kept invisible to the outside network. The target interface sends its configuration request directly to this MAC address, and the master may respond accordingly.

To establish communication between the target interface and the master node, a broadcast request mechanism like DHCP is adopted. The master, upon receiving such a request, identifies an originating requestor's switch port (by matching it with the MAC address), and returns to the requestor its needed configuration information. Such configuration information includes the master's (public) cluster IP address and the requestor's private IP address. In this way, configuration of the node is completely automatic from a deployment perspective. The requester denotes the target interfaces that request IP addresses from the master during initial configuration.

Target Interfaces do not need any public (just to distinguish over the private) IP addresses, because no client is sending packets to them directly. However target interfaces need their own IP addresses for internal communication with the master, so they use private IP addresses in the range 127.1.0.x. The NAT (network address translation) actually translates these private addresses into the master's (public) cluster IP address before putting the packets on the wire.

While the foregoing description and drawings represent the preferred embodiments of the present invention, it will be understood that various changes and modifications may be made without departing from the scope of the present invention.

What is claimed is:

1. An architecture to enable keyboard, video and mouse (KVM) access to a target from a remote client, comprising:

a master and a plurality of target interfaces that share a common Internet Protocol (IP) address on a network, the IP address being assigned to the master, the master including a processor and being arranged to provide a configuration;

an Ethernet switch having switch ports, individual ones of the target interfaces being connected to individual ones of the switch ports, the master being configured to determine into which ones of the switch ports the individual ones of the target interfaces are connected by reading addresses of at least one media access control (MAC) address table of a switch chipset so as to obtain an association between each of the target interfaces and corresponding port numbers of the Ethernet switch;

wherein the master is configured to allocate a session and assign a session identification in response to a request from the client to initiate a connection to a particular one of the target interfaces, wherein the master is configured to take steps after completing allocation of the session and assignment of the session identification, the steps including notifying the particular one of the target interfaces of the session and the session ID over a direct Transmission Control Protocol/Internet protocol (TCP/IP) connection between the master and the particular one of the target interfaces, informing the client of the session identification and configuring internal tables to associate the session identification with the particular one of the target interfaces, wherein the master receives a message from the client in which is given the session identification after the client establishes connection with the master, the master being configured to determine via the internal tables the particular one of the target interfaces that is associated with that session identification and then hands off a TCP/IP socket to the particular one of the target interfaces, wherein the particular one of the target interfaces sends all data to the remote client without the data passing through the processor of the master after the hand off, wherein the master is configured to answer initial configuration requests broadcast from the target interfaces, the Ethernet switch having a port-based virtual local area network (VLAN) configured to limit configuration request responses received by the target interfaces to responses generated by the master, and wherein the port-based VLAN is configured to include only the master and one or more external ports providing sole communications access for external devices, so that no external device may communicate directly with the target interfaces.

2. The architecture of claim 1, wherein the port-based VLAN is configured to include only the master and target switch ports so that only the master receives the initial configuration requests from the target interfaces to which the master responds to provide information concerning the configuration.

3. The architecture of claim 1, wherein the servers are dynamic host configuration protocol (DHCP) servers, and the initial configuration requests are DHCP requests.

4. The architecture of claim 1, wherein the master provides the configuration to enable access by a client to any one of the target interfaces, the client being on the network to enable establishing a connection with the master, the master being configured to authenticate and authorize the client over the connection to provide the client thereafter with information about availability of each of the target interfaces.

5. The architecture of claim 1, wherein the master is configured so that after handing off, the master forwards all future packets on the connection from the client to the particular one of the target interfaces until the connection is closed.

6. The architecture of claim 5, wherein the particular one of the target interfaces is configured to see the connection that is handed off as if made directly and uses the session identification to authorize the connection with the client server to thereafter send data directly to the client server through the Ethernet switch bypassing the master to thereby keep a majority of traffic from being subject to performance constraints of the master.

7. The architecture of claim 6, wherein the configuration is configured so that all packets from the client to the particular one of the target interfaces must be routed through the master.

8. The architecture of claim 7, wherein the packets are keyboard or mouse inputs.

9. A method of assembly of architecture to enable keyboard, video and mouse (KVM) access to a target from a remote client, comprising the steps of:
- configuring a master and a plurality of target interfaces to share a common Internet Protocol (IP) address on a network;
- assigning the IP address to the master, arranging the master to provide a configuration to each of the target interfaces, the master being a processor, wherein the master includes a processor;
- connecting individual ones of the target interfaces to individual ones of the switch ports of an Ethernet switch;
- configuring the master to determine into which ones of the switch ports the individual ones of the target interfaces are connected by reading addresses of at least one media access control (MAC) address table of a switch chipset so as to obtain an association between each of the target interfaces and corresponding port numbers of the Ethernet switch;
- configuring the master to allocate a session and assigning a session identification in response to a request from the client to initiate a connection to a particular one of the target interfaces;
- configuring the master to take steps after completing allocation of the session and assignment of the session identification, the steps including notifying the particular one of the target interfaces of the session and the session ID over a direct Transmission Control Protocol/Internet protocol (TCP/IP) connection between the master and the particular one of the target interfaces;
- informing the client of the session identification and configuring internal tables to associate the session identification with the particular one of the target interfaces;
- receiving a message from the client in which is given the session identification after the client establishes connection with the master, the master being configured to determine via the internal tables the particular one of the target interfaces that is associated with that session identification and then hand off a TCP/IP socket to the particular one of the target interfaces;
- sending all data to the remote client from the particular one of the target interfaces to the remote client without the data passing through the processor of the master after the hand off;
- configuring the master to answer initial configuration requests broadcast from the target interfaces; and
- configuring the Ethernet switch in a port-based virtual local area network (VLAN) configuration operable to limit configuration request responses received by the target interfaces to the answers generated by the master, wherein the step of configuring the Ethernet switch configures a port-based VLAN including only the master and one or more external ports providing sole communications access for external devices, so that no external device may communicate directly with the target interfaces.

10. The method of assembly of claim 9, wherein the step of configuring the Ethernet switch configures a port-based VLAN including only the master and target switch ports so that only the master receives initial configuration requests from the target interfaces to which the master responds to provide information concerning the configuration.

11. The method of assembly of claim 9, wherein the servers are dynamic host configuration protocol (DHCP) servers, and the initial configuration requests are DHCP requests.

12. An architecture to enable keyboard, video and mouse (KVM) access to a target from a remote client, comprising:
- a master and a plurality of target interfaces that share a common Internet Protocol (IP) address on a network, the IP address being assigned to the master, the master including a processor and being arranged to provide a configuration;
- an Ethernet switch having switch ports, individual ones of the target interfaces being connected to individual ones of the switch ports, the master being configured to determine into which ones of the switch ports the individual ones of the target interfaces are connected by reading addresses of at least one media access control (MAC) address table of a switch chipset so as to obtain an association between each of the target interfaces and corresponding port numbers of the Ethernet switch;
- wherein the master is configured to allocate a session and assign a session identification in response to a request from the client to initiate a connection to a particular one of the target interfaces,
- wherein the master is configured to take steps after completing allocation of the session and assignment of the session identification, the steps including notifying the particular one of the target interfaces of the session and the session ID over a direct Transmission Control Protocol/Internet protocol (TCP/IP) connection between the master and the particular one of the target interfaces, informing the client of the session identification and configuring internal tables to associate the session identification with the particular one of the target interfaces,
- wherein the master receives a message from the client in which is given the session identification after the client establishes connection with the master, the master being configured to determine via the internal tables the particular one of the target interfaces that is associated with that session identification and then hands off a TCP/IP socket to the particular one of the target interfaces,
- wherein the particular one of the target interfaces sends all data to the remote client without the data passing through the processor of the master after the hand off, and wherein the master has interfaces to the Ethernet switch that respectively use first and second MAC addresses, the first address comprising a public MAC address for communicating with the master on the Ethernet switch and the second address comprising a private, fixed MAC address arranged only for the master to receive target interface configuration requests so as to be kept invisible to the network, the target interface being configured to send initial configuration requests directly to the second MAC address.

13. A method of assembly of architecture to enable keyboard, video and mouse (KVM) access to a target from a remote client, comprising the steps of:

configuring master and a plurality of target interfaces to share a common Internet Protocol (IP) address on a network;

assigning the IP address to the master, arranging the master to provide a configuration to each of the target interfaces, the master being a processor, wherein the master includes a processor;

connecting individual ones of the target interfaces to individual ones of the switch ports of an Ethernet switch;

configuring the master to determine into which ones of the switch ports the individual ones of the target interfaces are connected by reading addresses of at least one media access control (MAC) address table of a switch chipset so as to obtain an association between each of the target interfaces and corresponding port numbers of the Ethernet switch;

configuring the master to answer a request broadcast from the target interfaces, providing the Ethernet switch with a configuration that blocks answers from other servers on the network from responding directly to the request broadcast from the target interfaces;

configuring the master to allocate a session and assigning a session identification in response to a request from the client to initiate a connection to a particular one of the target interfaces;

configuring the master to take steps after completing allocation of the session and assignment of the session identification, the steps including notifying the particular one of the target interfaces of the session and the session ID over a direct Transmission Control Protocol/Internet protocol (TCP/IP) connection between the master and the particular one of the target interfaces;

informing the client of the session identification and configuring internal tables to associate the session identification with the particular one of the target interfaces;

receiving a message from the client in which is given the session identification after the client establishes connection with the master, the master being configured to determine via the internal tables the particular one of the target interfaces that is associated with that session identification and then hand off a TCP/IP socket to the particular one of the target interfaces;

sending all data to the remote client from the particular one of the target interfaces to the remote client without the data passing through the processor of the master after the hand off; and configuring the master with interfaces to the Ethernet switch that respectively use first and second MAC addresses, the first address comprising a public MAC address for communicating with the master on the Ethernet switch and the second address comprising a private, fixed MAC address arranged only for the master to receive target interface configuration requests so as to be kept invisible to the network; and configuring the target interface to send initial configuration requests directly to the second MAC address.

* * * * *